July 20, 1965  F. C. ARRISON  3,195,856
TAPERED PLUG VALVE
Filed March 5, 1963
FIG. I.
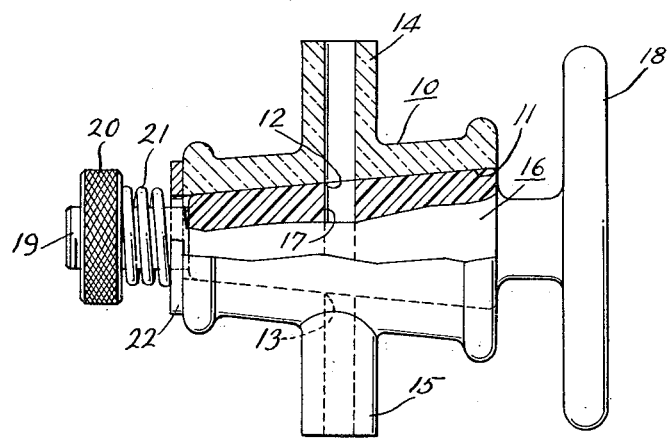
FIG. 2.
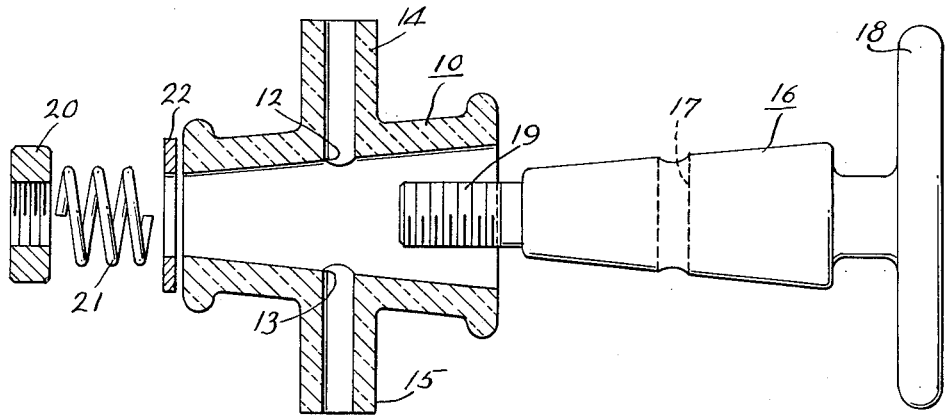
INVENTOR:
FRANK C. ARRISON
BY
Howson & Howson
ATTYS.

3,195,856
TAPERED PLUG VALVE
Frank C. Arrison, 2905 Edge Hill Road,
Huntingdon Valley, Pa.
Filed Mar. 5, 1963, Ser. No. 262,887
2 Claims. (Cl. 251—181)

This application is a continuation-in-part of my co-pending application, Serial Number 191,095, filed Apr. 30, 1962 now abandoned.

The present invention relates to a new and useful improvement in tapered plug valves such as stopcocks used in chemical installations and the like and has for an object the provision of improvements in this art.

Tapered plug valves of the type to which the present invention relates are widely used in chemical laboratory equipment. In chemical work such as this, corrosion, due to chemical interaction between the liquid being conveyed and the tubes and valves, commonly requires glass tubing and glass valves. The nature of the glass-to-glass contact of the glass valve body and the movable glass valve member or plug requires that the valve member be lubricated to provide the proper freedom of movement between the plug and valve body and to provide a full seat when needed. The lubricant, accordingly, is an indispensable part of such an all-glass valve. Many chemicals used in apparatus of this type, however, will dissolve or alter the lubricant, with the result that the chemical passing through the valve is contaminated, that the valve itself does not provide a proper fluid seal, and that the elements of the valve will bind or freeze.

To avoid the disadvantages of tapered plug valves having glass valve bodies and glass plugs, it has been proposed to provide tapered plug valves in which the valve body is formed of glass and the plug is formed of a chemically inert material which requires no lubrication to move freely relative to the glass valve body. Such valve plugs have been formed of synthetic resin such as Teflon, a polytetrafluoroethylene, sold commercially by the E. I. du Pont Company, and Kel–F, a polytrifluorochloro-ethylene material, sold commercially by M. W. Kellogg Company. These materials are known as polymerized fluoro-carbon resins. A tapered plug valve of this type is chemically inert, requires no lubricant, and avoids the above-mentioned disadvantages of all glass tapered plug valves having both glass bodies and glass plugs.

The basic configuration of these two above-mentioned tapered plug valves differs. In tapered plug valves consisting of a glass valve body and glass plug, the axial bore of the valve body and the plug are commonly made with a relatively gradual taper to provide for a strong wedging action for seating. Also, the interior surface of the valve body and the surface of the plug have a ground or etched finish. As opposed to this, in assemblies consisting of a glass valve body and a synthetic fluoro-carbon resin plug, the axial bore of the valve body and the plug are made with a relatively steep taper, giving less wedging action but preventing binding between the plug and valve body; and the internal surface of the valve body is highly polished and extremely smooth. With these prior constructions, it is not possible to use a conventional synthetic fluoro-carbon resin plug in a standard valve body made for a glass plug since the taper of the valve body made for a glass plug is so gradual that a matching taper on the synthetic resin plug would cause the plug to bind. Also, the relatively rough ground or etched finish on the valve body made for a glass plug will score the surface of the synthetic resin plug after a short period of time, thereby permitting substantial leakage. Alternatively, it is not feasible to use a glass plug in a valve body made for use in conjunction with a synthetic resin plug, since the extremely smooth finish on the valve body made for use with a synthetic resin plug will cause a glass plug to bind or freeze in the valve body and makes the use of lubricant impractical.

Generally, the preference among users of tapered plug valves of this type is for an all-glass unit, a glass valve body and a glass plug. However, because of the way in some instances in which this laboratory equipment is used with chemicals which will react with the lubricant, it is necessary at times for chemical laboratories to use tapered plug valves having a synthetic resin plug. In most cases the tapered plug valve is formed as an integral part of the test apparatus thereby requiring the stocking of duplicate pieces of such test apparatus. This duplication of equipment results in a high initial equipment cost and requires substantial storage space and installation expense.

With the foregoing in mind, a primary object of the present invention is to provide a novel tapered plug valve in which glass and synthetic resin plugs may be used interchangeably with both the glass plug and synthetic resin plug being freely rotatable and providing a proper seal.

The objects and various features of novelty and advantages of the present invention are more fully disclosed and described with reference to the accompanying drawings, in which:

FIG. 1 is a side elevational view partially in section of a tapered plug valve made in accordance with the present invention; and FIG. 2 is an exploded view partially in section illustrating the various components of the tapered plug valve in a disassembled relation.

Referring more specifically to the drawings, the tapered plug valve of the present invention comprises a valve body 10 formed of glass or other vitreous material having a uniformly tapered internal axial bore forming a valve seat 11. The valve seat 11 is partially interrupted at approximately its mid-point by oppositely disposed inlet and outlet ports 12 and 13, respectively, formed at the inner ends of conduits 14 and 15, respectively, which may be made as integral parts of the valve body. The inlet and outlet ports 12 and 13, for the usual straight through flow are diametrically spaced from one another at opposite sides of said valve seat and the conduits 14 and 15 are in axial alignment with one another perpendicular to the axis of the bore of the valve body.

A generally frusto-conical plug 16 is provided having a taper corresponding exactly to the taper of the valve seat 11 and adapted to be positioned within the valve body, as illustrated in FIG. 1. The plug 16 has a bore 17 extending transversely therethrough which, in at least one position of the plug relative to the valve seat, is adapted to be in alignment with the inlet and outlet ports 12 and 13 to permit passage of fluid through the plug valve and, in at least one other position of the plug relative to the valve seat, is out of alignment with the ports 12 and 13 to prevent passage of fluid therethrough. An operating handle 18 is interconnected with the plug 16 to permit free rotation of the plug. Means are provided, as in all tapered plug valves of this type, to resiliently maintain the plug 16 in position within the bore of the valve body. In the illustrated embodiment of the present invention it is accomplished by providing a threaded spindle 19 at the small end of the plug on which an adjusting nut 20 is adapted to be received. A spring 21 and washer 22 are positioned about the spindle between the end of the valve body and the adjusting nut and serve to resiliently maintain the plug in wedging position within the bore of the valve body while permitting free rotation of the plug.

According to the present invention, to permit interchangeability of glass and synthetic resin plugs in a single glass valve body, the taper of the valve seat must be between set limits and the valve seat must have a finish of a predetermined smoothness. It will be understood that the finish of the glass plug should match the finish of the valve seat, while the synthetic resin valve body will have a smooth wax-like or polished finish. The taper of the valve seat and plug, expressed as a ratio of a given length along the axis of the seat or plug to the change in diameter for the given length, must be between 4 to 1 and 7 to 1, with the preferred range being 5 to 1 to 7 to 1. A steeper taper than this would not provide sufficient seating pressure for a glass plug, while a more gradual taper than this would cause the synthetic resin plug to bind.

The finish of the surface of the valve seat is also important. This finish must be between 7 and 20 micro-inches as measured by a profilometer. That is, the distance between high and low points on the surface must be between 7 and 20 micro-inches. A rougher finish than this would score the surface of the synthetic resin plug while a smoother finish than this would prevent free rotary movement of the glass plug. Accordingly, it will be seen that the combination of a specific taper range plus a specific finish range on the valve seat is necessary to provide a useable plug valve of this type which can be used satisfactorily with either a glass plug having the same finish or with a fluoro-carbon resin plug with a smooth finish.

From the foregoing, it will be seen that the present invention provides a novel tapered plug valve in which glass and synthetic resin plugs may be used interchangeably and still provide freedom of movement of the plugs and proper sealing effect. By synthetic resin as used herein is meant a polymerized fluorocarbon resin, such as Teflon, Kel–F and similar materials as defined previously.

While a specific form of tapered plug valve has been illustrated and described herein, it is not intended to limit the invention to such a disclosure and changes and modifications may be incorporated and embodied therein within the scope of the following claims.

I claim:

1. A tapered plug valve of the type described comprising a valve body formed of a vitreous material, said valve body including means defining an axial bore extending through said valve body which is tapered toward one end thereof forming a valve seat for the receipt of either a synthetic fluoro-carbon resin plug or a vitreous plug, said plug being frusto-conical and tapered toward one end conforming to the taper of said bore so that it may be snugly nested therein, a threaded stem projecting from said one end of the plug beyond said one end of the valve body, a compression spring positioned over said stem, a nut mounted on said stem to maintain said compression spring in engagement with said one end of the valve body and thereby urge said plug in fluid-tight relationship with the valve seat, said bore being tapered so that the ratio of the axial length of the bore to the difference between the diameter of the bore at one end and the diameter of the bore at the opposite end is between 4 to 1 and 7 to 1, and said valve seat having a finish of between 7 to 20 micro-inches.

2. A tapered plug valve of vitreous material adapted to use a plug of vitreous material or a plug of fluoro-carbon resin material, comprising in combination, a valve body of vitreous material including means defining a frusto-conical axial bore extending through the valve body to form a valve seat, said valve body also including means forming fluid passageways extending transversely to the axis of said bore and having ports in said bore, a frusto-conical valve plug turnably fitting in said bore and having a passageway with ports arranged to match with the ports of said bore, and means coacting between said valve body and plug urging the plug in a direction to tighten in said bore, said bore and the plug having a taper, expressed as a ratio of a given length to a change in diameter for said given length of between 4 to 1 and 7 to 1, said valve bore having in the seating portion a surface finish thereon between 7 and 20 micro-inches, and said valve plug consisting of the following:
 (a) a plug of vitreous material having a seating surface finish thereon between 7 and 20 micro-inches,
 (b) a plug of synthetic fluoro-carbon resin having a smooth surface finish.

References Cited by the Examiner

UNITED STATES PATENTS

| 930,017 | 8/09 | Yankauer | 251—181 |
| 2,876,985 | 3/59 | Birchall et al. | 251—181 XR |
| 3,038,694 | 6/62 | Dunbeck et al. | 251—181 |
| 3,093,359 | 6/63 | De Woody | 251—181 XR |

FOREIGN PATENTS

| 1,261,017 | 4/61 | France. |
| 65,086 | 1/50 | Netherlands. |

LAVERNE D. GEIGER, *Primary Examiner.*